(12) United States Patent
Fujiwara et al.

(10) Patent No.: US 11,139,653 B2
(45) Date of Patent: Oct. 5, 2021

(54) SYSTEM POWER SUPPLY CIRCUIT

(71) Applicant: ROHM CO., LTD., Kyoto (JP)

(72) Inventors: Akira Fujiwara, Kyoto (JP); Takashi Kimura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 141 days.

(21) Appl. No.: 16/209,083

(22) Filed: Dec. 4, 2018

(65) Prior Publication Data

US 2019/0109456 A1 Apr. 11, 2019

Related U.S. Application Data

(63) Continuation of application No. PCT/JP2017/018205, filed on May 15, 2017.

(30) Foreign Application Priority Data

Jun. 7, 2016 (JP) .............................. JP2016-113485

(51) Int. Cl.
*H02J 1/10* (2006.01)
*G06F 1/30* (2006.01)
(Continued)

(52) U.S. Cl.
CPC .................. *H02J 1/10* (2013.01); *G06F 1/30* (2013.01); *H02H 7/20* (2013.01); *H02J 1/00* (2013.01); *H02J 1/14* (2013.01); *H02J 9/04* (2013.01)

(58) Field of Classification Search
CPC ..... H02J 1/10; H02J 1/14; H02H 7/20; H02H 7/00; B60L 1/00; B60L 2210/10; B60L 3/00; B60L 3/0046
(Continued)

(56) References Cited

U.S. PATENT DOCUMENTS

2005/0200202 A1* 9/2005 Mihara ..................... H02J 1/10
307/10.1
2007/0013231 A1* 1/2007 Yamashita ................ B60L 1/00
307/9.1
(Continued)

FOREIGN PATENT DOCUMENTS

CN 101222134 A 7/2008
CN 101335449 A 12/2008
(Continued)

OTHER PUBLICATIONS

International Search Report corresponding to Application No. PCT/JP217/018205; dated Jul. 11, 2017.
(Continued)

*Primary Examiner* — Hal Kaplan
*Assistant Examiner* — Swarna N Chowdhuri
(74) *Attorney, Agent, or Firm* — Cantor Colburn LLP (57) ABSTRACT

A system power supply circuit receives an input voltage $V_{IN}$, and supplies a power supply voltage to multiple load circuits including a microcomputer. Multiple power supply circuits support the multiple load circuits. An abnormality detection circuit generates an abnormality detection signal that is negated when the input voltage $V_{IN}$ is within, and asserted when it deviates from, the first voltage range, and outputs this signal to the microcomputer. The interface circuit can communicate with the microcomputer. The interface circuit receives a control signal generated by the microcomputer in response to abnormality detection signal assertion, and suspends power supply circuit operation of a channel indicated by the control signal. When the input voltage $V_{IN}$ deviates from a second voltage range defined to be wider than the first voltage range, an internal protection circuit suspends at least one power supply circuit of a predetermined channel.

11 Claims, 7 Drawing Sheets

(51) Int. Cl.
*H02J 1/14* (2006.01)
*H02H 7/20* (2006.01)
*H02J 1/00* (2006.01)
*H02J 9/04* (2006.01)

(58) Field of Classification Search
USPC .......................................... 307/10.1, 9.1, 65
See application file for complete search history.

(56) References Cited

U.S. PATENT DOCUMENTS

| | | | |
|---|---|---|---|
| 2011/0231042 A1* | 9/2011 | Ueda | B60L 3/0084 701/22 |
| 2016/0059807 A1* | 3/2016 | Iwasaki | B60R 16/03 307/10.1 |
| 2017/0141570 A1* | 5/2017 | Vijayan | H02M 1/32 |

FOREIGN PATENT DOCUMENTS

| | | |
|---|---|---|
| CN | 101607542 A | 12/2009 |
| JP | 07064652 A | 3/1995 |
| JP | 2001177998 A | 6/2001 |
| JP | 2012131091 A | 7/2012 |
| JP | 2013089060 A | 5/2013 |

OTHER PUBLICATIONS

Written Opinion of the International Searching Authority corresponding to Application No. PCT/JP2017/018205; dated Jul. 11, 2017.

SIPO First Office Action corresponding to Application No. 201780028028.8; dated Jul. 1, 2019.

* cited by examiner

SYSTEM POWER SUPPLY CIRCUIT

CROSS REFERENCE TO RELATED APPLICATION

This application is a continuation under 35 U.S.C. § 120 of PCT/JP2017/018205, filed May 15, 2017, which is incorporated herein reference and which claimed priority to Japanese Application No. 2016-113485, filed Jun. 7, 2016. The present application likewise claims priority under 35 U.S.C. § 119 to Japanese Application No. 2016-113485, filed Jun. 7, 2016, the entire content of which is also incorporated herein by reference.

BACKGROUND OF THE INVENTION

1. Field of the Invention

The present invention relates to a system power supply circuit that generates multiple power supply voltages.

2. Description of the Related Art

An electronic device includes various kinds of circuits (which will collectively be referred to as "load circuits" hereafter) such as a microcomputer, memory, an interface circuit such as a USB (Universal Serial Bus), a liquid crystal display, an audio circuit, etc. In order to supply a suitable power supply voltage to each of such load circuits, a system power supply circuit is employed.

Figure 1:
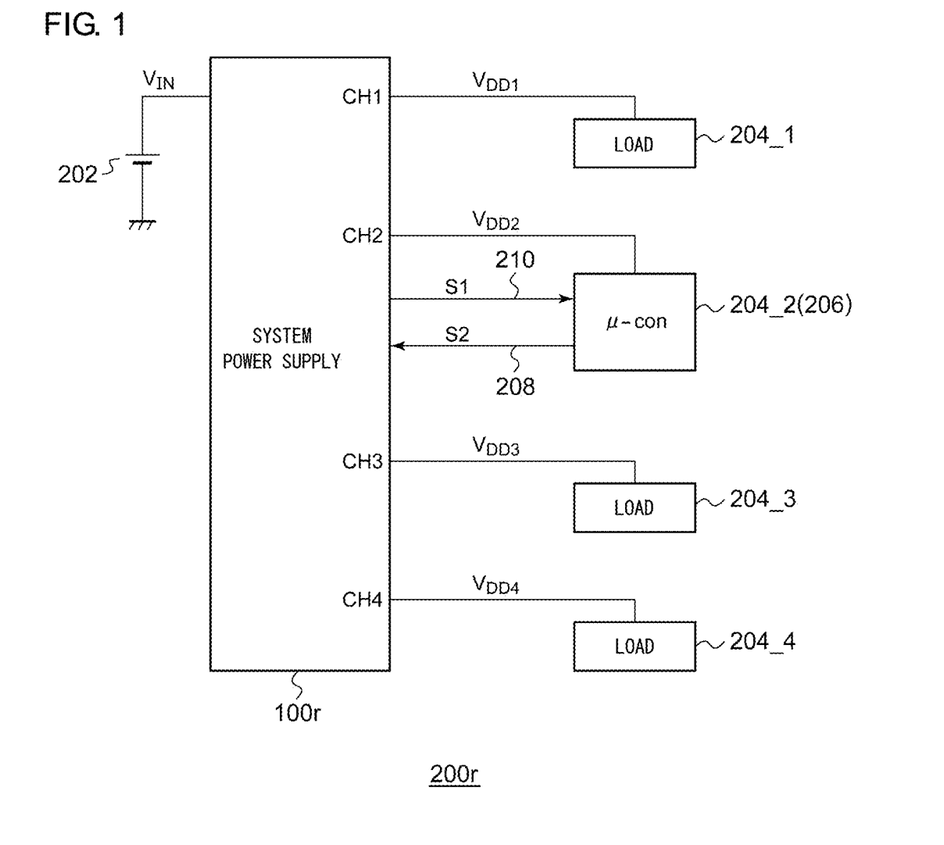
FIG. 1 is a block diagram showing an electronic device including a system power supply circuit investigated by the present inventor.

FIG. 1 is a block diagram showing an electronic device 200r including a system power supply circuit 100r investigated by the present inventor. The system power supply circuit 100r is configured as a multi-channel (in this example, four-channel) power supply circuit. The system power supply circuit 100r receives a DC input voltage (battery voltage) $V_{IN}$ from a battery 202, steps down (or otherwise steps up) the input voltage thus input, and outputs power supply voltages $V_{DD1}$ through $V_{DD4}$ each having a suitable level to multiple load circuits 204_1 through 204_4, respectively.

With an in-vehicle device such as a car audio apparatus, the voltage of the battery 202 is employed as the input voltage $V_{IN}$ of the system power supply circuit 100r. Accordingly, very large variation of the battery voltage is directly input to the system power supply circuit 100r. In a case in which the input voltage $V_{IN}$ input to the system power supply circuit 100r deviates from a suitable voltage range, the power supply voltages $V_{DD1}$ through $V_{DD4}$ can come to be in an overvoltage state or in an undervoltage state (which will collectively be referred to as a "voltage abnormality state"). If the electronic device 200r continues its operation in the voltage abnormality state, this causes a problem of an unstable operation state or a problem of degraded reliability of the load circuit 204 or the system power supply circuit 100.

In order to solve such a problem, the system power supply circuit 100r is provided with a function of detecting an abnormality state of the input voltage $V_{IN}$. The load circuit 204$_{13}$ 2, which is one from among the multiple load circuits 204_1 through 204_4, is configured as a microcomputer (host processor) 206 that integrally controls the electronic device 200r. The system power supply circuit 100r operates under a control operation of the microcomputer 206.

The system power supply circuit 100r and the microcomputer 206 are coupled via a serial bus 208, which allows them to communicate with each other. Furthermore, the system power supply circuit 100r and the microcomputer 206 are coupled via a signal line 210. Upon detecting a voltage abnormality state, the system power supply circuit 100r asserts (for example, sets to the high level) an abnormality detection signal (flag) S1 to be transmitted via the signal line 210, so as to notify the microcomputer 206.

In response to the assertion/negation of the abnormality detection signal S1, the microcomputer 206 transmits a control signal S2 via the serial bus 208 so as to instruct the system power supply circuit 100r to suspend or restore the operation thereof.

Figure 2:
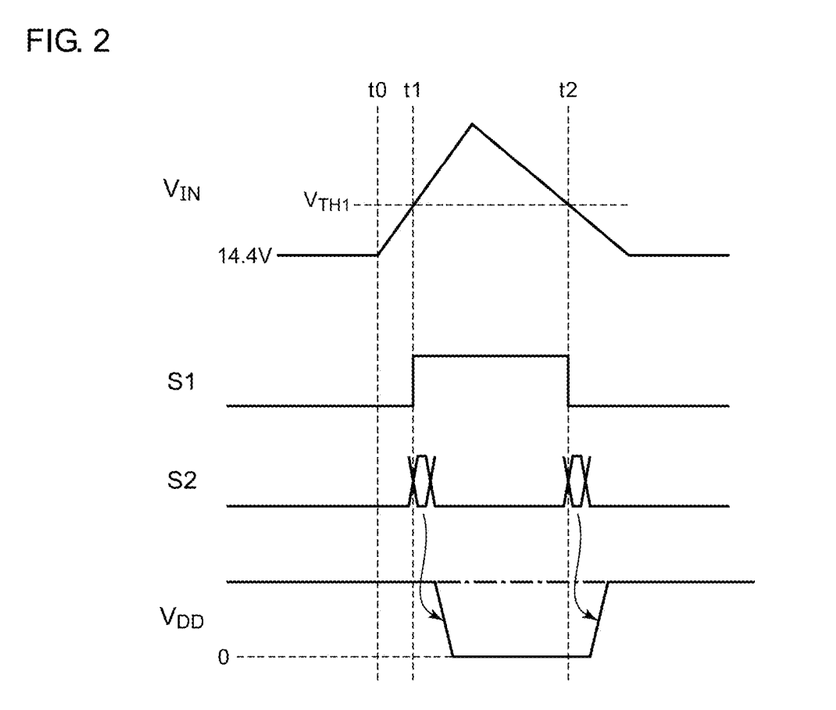
FIG. 2 is a diagram showing an abnormality protection sequence of the electronic device shown in FIG. 1.

FIG. 2 is a diagram showing an abnormality protection sequence employed in the electronic device 200r shown in FIG. 1. Before the time point t0, the input voltage $V_{IN}$ is maintained at a normal level (e.g., 14.4 V). At the time point t0, a load dump surge occurs, which leads to a sudden rise of the input voltage $V_{IN}$. When the input voltage $V_{IN}$ exceeds a threshold value $V_{TH1}$(e.g., 20 V) defined within the system power supply circuit 100r at the time point t1, the system power supply circuit 100r detects an overvoltage state, and asserts the abnormality detection signal S1 so as to notify the microcomputer 206. The microcomputer 206 transmits the control signal S2 to the system power supply circuit 100r via the serial bus 208 in order to instruct the system power supply circuit 100r to suspend all the channels CH1, CH3, and CH4 expect for a channel (CH2 in FIG. 1) required for the microcomputer 206 itself to operate. In response to the control signal S2, the system power supply circuit 100r suspends the operation of the channels CH1, CH2, and CH4, thereby lowering the power supply voltages $V_{DD1}$, $V_{DD3}$, and $V_{DD4}$.

When the input voltage $V_{IN}$ becomes lower than the threshold value $V_{TH1}$ such that it returns to the normal state at the time point t2, the system power supply circuit 100r negates (sets to the low level) the abnormality detection signal S1 so as to notify the microcomputer 206. In response to the negation of the abnormality detection signal S1, the microcomputer 206 transmits the control signal S2. The system power supply circuit 100r restores the power supply voltages $V_{DD1}$, $V_{DD3}$, and $V_{DD4}$ of the respective channels CH1, CH3, and CH4 according to the control signal S2.

As a result of investigating the electronic device 200r shown in FIG. 1, the present inventor has come to recognize the following problem. In the time chart shown in FIG. 2, if an abnormality occurs in serial communication, which is a downstream step of the assertion of the abnormality detection signal S1, the system power supply circuit 100r is not able to receive the control signal S2. In this case, the system power supply circuit 100r is not able to suspend the channels indicated by the microcomputer 206. As a result, the supply of the power supply voltage $V_{DD}$ is continued as indicated by the line of alternately long and short dashes. If the input voltage $V_{DD}$ further rises in this state, this leads to the occurrence of an abnormality or malfunction in the system power supply circuit 100r. Alternatively, this can have adverse effects on the load circuit 204.

In a case in which the input voltage $V_{IN}$ falls such that it comes to be in an undervoltage state, if the system power supply circuit 100r has failed to receive the control signal S2 that instructs the system power supply circuit 100r to suspend its operation, the same problem occurs. It should be noted that, in addition to such an in-vehicle device, such a problem can occur in various kinds of platforms that has the potential to involve large variation of the input voltage $V_{IN}$.

SUMMARY OF THE INVENTION

The present invention has been made in order to solve such a problem. Accordingly, it is an exemplary purpose of an embodiment of the present invention to provide a system power supply circuit with improved reliability.

An embodiment of the present invention relates to a system power supply circuit structured to receive an input voltage and to supply a power supply voltage to multiple load circuits including a microcomputer. The system power supply circuit comprises: multiple channels of power supply circuits that respectively correspond to the multiple load circuits; an abnormality detection circuit structured to generate an abnormality detection signal, which is negated when the input voltage is within a first voltage range, and asserted when the input voltage deviates from the first voltage range, and to output the abnormality detection signal to the microcomputer; an interface circuit structured to communicate with the microcomputer, to receive a control signal generated by the microcomputer in response to an assertion of the abnormality detection signal, and to suspend the power supply circuit of a particular channel indicated by the control signal; and an internal protection circuit structured to suspend at least one power supply circuit of at least one predetermined channel when the input voltage deviates from a second voltage range defined to be wider than the first voltage range.

With this embodiment, even if the protection operation via the microcomputer fails, another protection operation is provided by means of the internal protection circuit. This provides improved reliability.

Also, when the input voltage comes to be within the second voltage range after the power supply circuit of the predetermined channel is suspended as a result of the input voltage exceeding an upper-side threshold of the second voltage range, the internal protection circuit may restart the operation of the power supply circuit of the predetermined channel. This allows the overall system to be automatically restored to the original state.

Also, the power supply circuit of the predetermined channel suspended as a result of the input voltage becoming lower than a lower-side threshold value of the second voltage range may be restored in response to a control signal received from the microcomputer. In the undervoltage state in which the input voltage has fallen, this arrangement has the potential to cause a situation in which the microcomputer shuts down due to insufficient power supply voltage to the microcomputer. In this situation, in a case in which the power supply circuit of the predetermined channel is independently restarted by the system power supply circuit, an inconsistency occurs between the state of the microcomputer and the state of the system power supply circuit. In order to solve such a problem, by instructing the microcomputer to control the restart operation after the voltage state is restored from the undervoltage state, this arrangement prevents such an inconsistency between them.

Also, the system power supply circuit may further comprise a register. Also, the on/off states of the multiple channels of the power supply circuits may be switched according to a control value stored at a corresponding address in the register. Also, the control signal may comprise multiple control values that respectively correspond to the multiple channels, and each of which specifies the on/off state of the power supply circuit of the corresponding channel. Also, the interface circuit may write each of the multiple control values to the register. This allows the system designer to freely design the state of each channel in a voltage abnormality state according to the values written to the register.

Also, the register may store a setting value that defines the lower-side threshold value of the second voltage range. The allowable fall in voltage of the power supply voltages that can occur due to the undervoltage state of the input voltage is to be designed depending on the load circuits including the microcomputer. Accordingly, by allowing the system designer to specify the lower-side threshold value of the second voltage range, this arrangement provides optimum protection for each system.

Also, when the power supply circuit of the predetermined channel is suspended as a result of the input voltage becoming lower than a lower-side threshold value of the second voltage range, the register may be initialized.

Also, the input voltage may be a battery voltage output from an in-vehicle battery. Also, the system power supply circuit may be used for electronic devices installed in a vehicle.

Also, the system power supply circuit may be integrated on a single semiconductor substrate, or otherwise configured as a module. An "integrated" arrangement represents an arrangement in which principal components are monolithically integrated. Also, an inductor of a DC/DC converter, a smoothing capacitor, or the like may be provided as an external component of a semiconductor substrate. By integrating the principal components of the system power supply circuit on a single chip or otherwise by configuring such principal components in the form of a module, this arrangement allows the circuit area to be reduced, and allows the circuit elements to have uniform characteristics.

Another embodiment of the present invention relates to an electronic device. The electronic device comprises: a DC power supply; multiple load circuits including a microcomputer; and a system power supply circuit structured to receive an input voltage from the DC power supply, and to supply a power supply voltage to the multiple load circuits.

The DC power supply may be an in-vehicle battery. Also, the DC power supply may be configured as an in-vehicle electronic device. The in-vehicle battery involves large voltage variation. Accordingly, protection provided by the internal protection circuit can be effectively applied.

It should be noted that any desired combinations of the aforementioned components and the components or representation of the present invention may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled. Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

Figure 3:
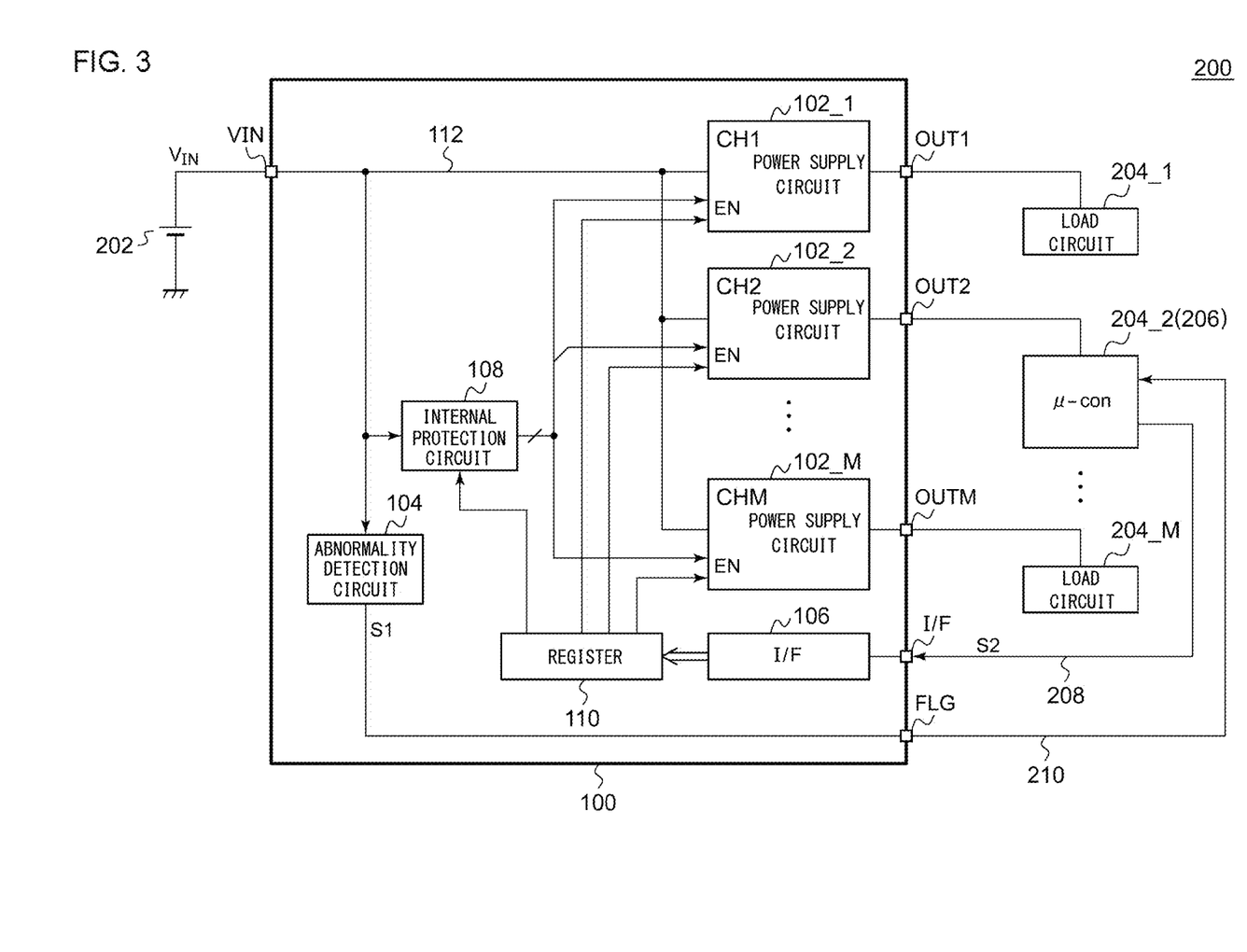
FIG. 3 is a circuit diagram showing an electronic device including a system power supply circuit according to an embodiment.

FIG. 3 is a circuit diagram showing an electronic device 200 including a system power supply circuit 100 according to an embodiment. The electronic device 200 includes a battery 202 configured as a DC power supply, a system power supply circuit 100, and M multiple (M represents an integer of 2 or more) load circuits 204_1 through 204_M. One from among the multiple load circuits 204_1 through 204_M, i.e., the load circuit 204_2, is configured as a microcomputer 206 that integrally controls the electronic device 200. The other load circuits 204 are not restricted in particular. As such load circuits 204, various kinds of circuits may be employed depending on the usages and functions of the electronic device 200.

The system power supply circuit 100 receives an input voltage $V_{IN}$ from the battery 202, and supplies power supply voltages $V_{DD1}$ through $V_{DDM}$ to the multiple load circuits 204_1 through 204_M, respectively. The system power supply circuit 100 is configured as a function IC (Integrated Circuit) such that its principal components are integrated on a single semiconductor substrate. The input voltage $V_{IN}$ is supplied to an input (VIN) terminal of the system power supply circuit 100. Furthermore, multiple output terminals OUT1 through OUTM are coupled to the corresponding load circuits 204_1 through 204_M. In FIG. 3, for simplicity of description and for ease of understanding, external chip components that form the power supply circuit will be omitted. In the following description, the symbol "_#" that represents the channel number will be omitted as appropriate in a case in which there is no need to distinguish between the channels.

The system power supply circuit 100 includes power supply circuits 102_1 through 102_13 M of the multiple channels CH1 through CHM, an abnormality detection circuit 104, an interface circuit 106, an internal protection circuit 108, and a register 110.

The power supply circuits 102_1 through 102_13 M of the multiple channels correspond to the multiple load circuits 204_1 through 204_M, respectively. The power supply circuit 102_i for each channel CHi (i =1, 2, . . . , M) supplies a power supply voltage $V_{DDi}$ to the corresponding load circuit 204_i. The configuration of the power supply circuit 102 may be changed for each channel. Specifically, the power supply circuit 102 of a given channel may be configured as a DC/DC converter. The power supply circuit 102 of another channel may be configured as a linear regulator. Also, the DC/DC converter may be configured as a step-down DC/DC converter or a step-up DC/DC converter.

Description has been made with reference to FIG. 3 regarding an arrangement in which the power supply circuits 102 of all the channels each receive the input voltage $V_{IN}$ via the input line 112. However, the present invention is not restricted to such an arrangement. For example, the power supply circuit 102 of a given channel may receive, via its input, the output voltage of the power supply circuit 102 of another channel.

The abnormality detection circuit 104 receives the input voltage $V_{IN}$ via the input line 112. The abnormality detection circuit 104 generates the abnormality detection signal S1, which is negated when the input voltage $V_{IN}$ is within a first voltage range $V_{RNG1}$, and which is asserted when it deviates from the first voltage range $V_{RNG1}$. Description will be made with the upper-side threshold value of the first voltage range $V_{RNG1}$ as $V_{H1}$, and with the lower-side threshold value as $V_{L1}$. The abnormality detection signal S1 is input to the microcomputer 206 via a flag terminal (FLG) and the signal line 210.

The interface circuit 106 is coupled to the microcomputer 206 via the serial bus 208, which supports serial communication. The format of the serial interface is not restricted in particular. For example, the I²C (Inter IC) bus, SPI (Serial Peripheral Interface), or the like may be employed.

In response to assertion of the abnormality detection signal S1, the microcomputer 206 generates a control signal S2a that indicates the channel CH of which the power supply circuit 102 is to be suspended, and transmits the control signal S2a to the interface circuit 106 via the serial bus 208. Furthermore, in response to negation of the abnormality detection signal S1, the microcomputer 206 generates a control signal S2b that indicates the channel of which the power supply circuit 102 is to be operated, and transmits the control signal S2b to the interface circuit 106 via the serial bus 208.

The interface circuit 106 receives the control signal S2a generated by the microcomputer 206 in response to the assertion of the abnormality detection signal S1. In this case, the interface circuit 106 suspends the operation of the power supply circuit 102 of the channel CH indicated by the control signal S2a.

Furthermore, the interface circuit 106 receives the control signal S2b generated by the microcomputer 206 in response to the negation of the abnormality detection signal S1. In this case, the interface circuit 106 operates the power supply circuit 102 of the channel indicated by the control signal S2b.

The internal protection circuit 108 is provided as a protection backup circuit that operates based on the control signal S2 received from the microcomputer 206. When the input voltage $V_{IN}$ deviates from a second voltage range $V_{RNG2}$ defined to be wider than the first voltage range $V_{RNG1}$, the internal protection circuit 108 asserts (sets to the high level) an internal component protection signal S3, so as to suspend the power supply circuit of at least one predetermined channel. The predetermined channel may be selected without relation to an instruction of the microcomputer 206. It should be noted that, in a case in which the power supply voltage required to operate the microcomputer 206 is suspended, this disables the overall system operation. Accordingly, in this example, the channel CH2 that supports the microcomputer 206 and a channel (e.g., channel CH3) that supports a peripheral circuit (e.g., memory) of the microcomputer 206 are eliminated from the candidates of channels to be suspended. In this case, as an example, the remaining channels, i.e., the channels CH1 and CH4 through CHM, may be defined as the predetermined channels. Description will be made with the upper-side threshold value of the second voltage range $V_{RNG2}$ as $V_{H2}$ and with the lower-side threshold value thereof as $V_{L2}$.

Figure 4:
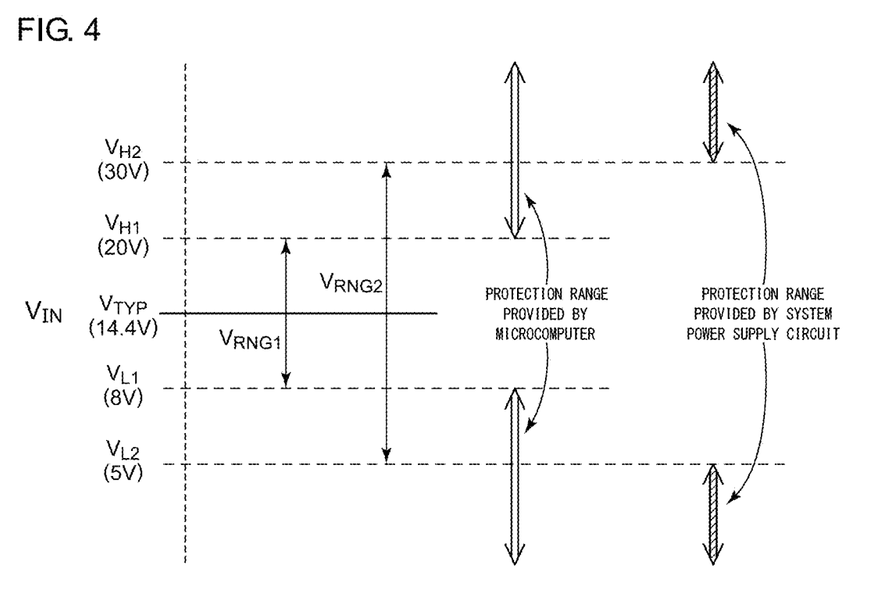
FIG. 4 is a level diagram showing an input voltage $V_{IN}$.

The above is the configuration of the system power supply circuit 100. Next, description will be made regarding the operation thereof. FIG. 4 is a level diagram showing the input voltage $V_{IN}$. The first voltage range $V_{RNG1}$ represents a normal voltage range in which no protection is required. The regions outside of the first voltage ranges $V_{RNG1}$, i.e., the range $V_{IN} > V_{H1}$ and the range $V_{IN} < V_{L1}$, are each a range in which protection is required under a control operation of the microcomputer. Furthermore, the regions outside of the second voltage range $V_{RNG2}$, i.e., the range $V_{IN} > V_{H2}$ and the range $V_{IN} < V_{L2}$, are each a range in which protection is required by means of the system power supply circuit 100 itself. Accordingly, even if the protection by means of the microcomputer has failed, this arrangement provides protection by means of the internal protection circuit, thereby providing improved reliability.

Figure 5A:
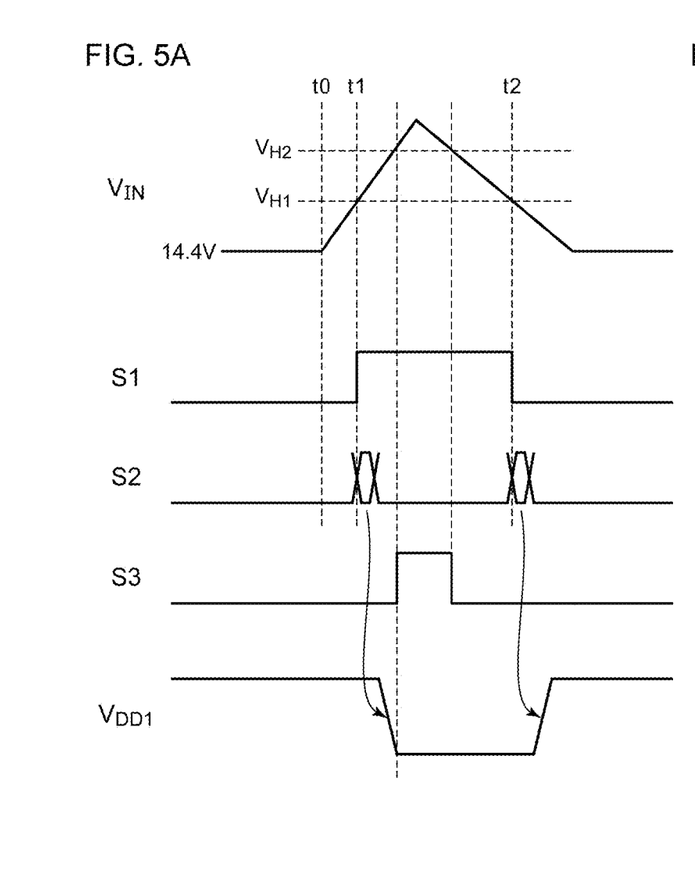
FIG. 5A and FIG. 5B are operation waveform diagrams each showing an operation of the electronic device shown in FIG. 2 in an overvoltage state.
Figure 5B:
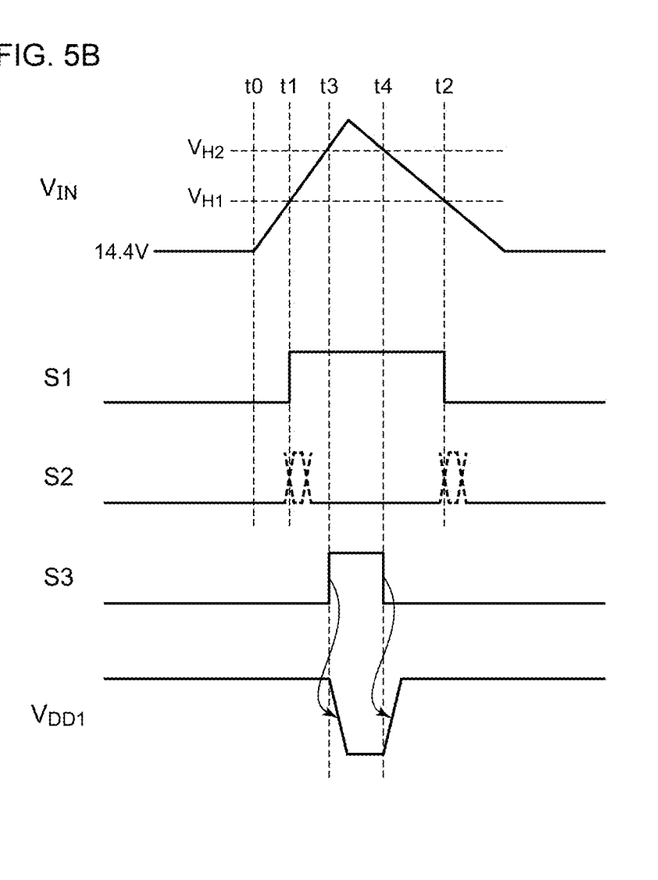

FIG. 5A and FIG. 5B are operation waveform diagrams each showing an operation of the electronic device 200 shown in FIG. 2 in an overvoltage state. FIG. 5A is a diagram showing the shutdown operation and restoration operation supported by the control operation of the microcomputer. This operation is the same as that shown in FIG. 2, and accordingly description thereof will be omitted. In this example, the channel CH1 is employed as the predetermined channel.

FIG. 5B shows the operation when a failure has occurred in the serial communication. If the interface circuit 106 has failed to receive the control signal S2 immediately after the time point t1, the power supply circuit 102_1 of the predetermined channel is not suspended. Accordingly, the power supply voltage $V_{DD1}$ remains at the same voltage level.

Subsequently, the input voltage $V_{IN}$ further rises. When the input voltage $V_{IN}$ exceeds the upper-side threshold value $V_{H2}$ of the second voltage range $V_{RNG2}$ at the time point t3, the internal component protection signal S3 is asserted. In this state, the internal protection circuit 108 suspends the operation of the power supply circuit 102_1 of the predetermined channel. This lowers the power supply voltage $V_{DD1}$. Subsequently, when the input voltage $V_{IN}$ returns to a value within the second voltage range $V_{RNG2}$ at the time point t4, the internal component protection signal S3 is negated. In this state, the internal protection circuit 108 returns the power supply circuit 102_1 of the predetermined channel to the operation state, thereby raising the power supply voltage $V_{DD1}$.

With this operation, this arrangement is capable of suspending the power supply circuit of the predetermined channel in the overvoltage state even in a case a failure has occurred in the communication with the microcomputer. This allows the circuit to be protected.

Figure 6A:
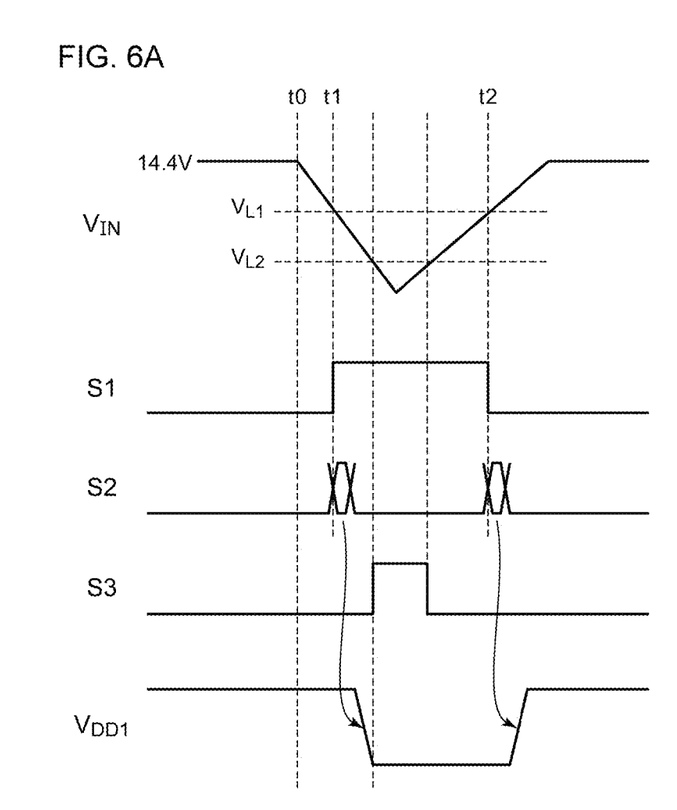
FIG. 6A and FIG. 6B are operation waveform diagrams each showing an operation of the electronic device shown in FIG. 2 in an undervoltage state.
Figure 6B:
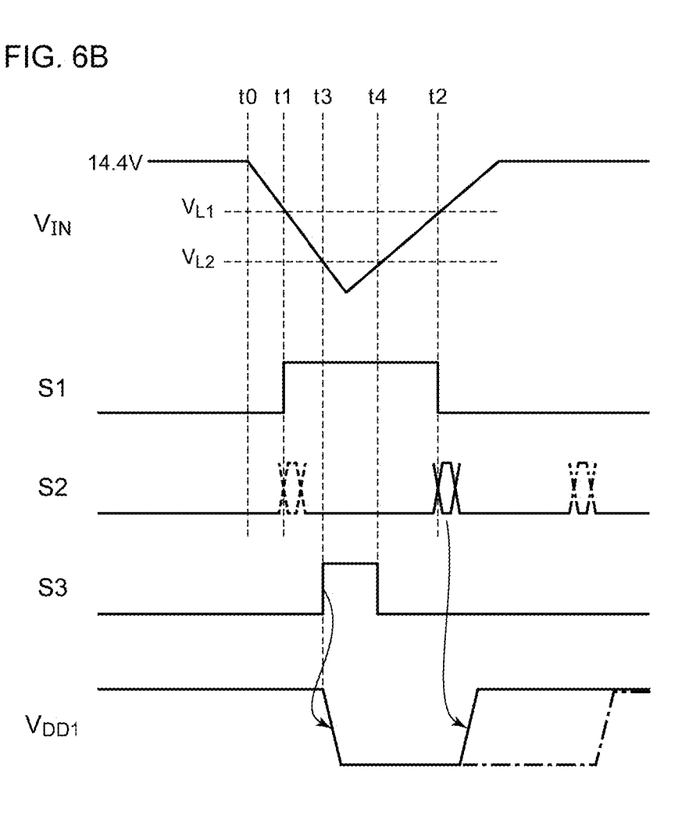

FIG. 6A and FIG. 6B are operation waveform diagrams each showing an operation of the electronic device 200 shown in FIG. 2 in the undervoltage state. FIG. 6A is a diagram showing the shutdown operation and the restoration operation by the control operation of the microcomputer. Before the time point t0, the input voltage $V_{IN}$ is maintained at a normal level (e.g., 14.4 V). At the time point t0, disconnection or the like occurs in the battery, and the input voltage $V_{IN}$ falls. When the input voltage $V_{IN}$ becomes lower than the lower-side threshold value $V_{L1}$ of the first voltage range $V_{RNG1}$ at the time point t1, the abnormality detection signal S1 is asserted. In response to the assertion of the abnormality detection signal S1, the microcomputer 206 transmits the control signal S2 to the interface circuit 106. The interface circuit 106 suspends the operation of the power supply circuit 102_1 of the channel (e.g., CH1) indicated by the control signal S2.

When the input voltage $V_{IN}$ exceeds the threshold value $V_{L1}$ and returns to the normal state at the time point t2, the system power supply circuit 100 negates (sets to the low level) the abnormality detection signal S1 so as to notify the microcomputer 206. In response to the negation of the abnormality detection signal S1, the microcomputer 206 transmits the control signal S2. The system power supply circuit 100r restores the power supply circuit 102 of the channel CH1 indicated by the control signal S2 to the operation state.

FIG. 6B shows the operation when a failure occurs in the serial communication. When the interface circuit 106 has failed to receive the control signal S2 immediately after the time point t1, the operation of the power supply circuit 102_1 of the predetermined channel cannot be suspended. In this state, the power supply voltage $V_{DD1}$ is maintained at the original voltage level.

When the input voltage $V_{IN}$ further falls and becomes lower than the lower-side threshold value $V_{L2}$ of the second voltage range $V_{RNG2}$ at the time point t3, the internal component protection signal S3 is asserted. In this state, the internal protection circuit 108 suspends the operation of the power supply circuit 102_1 of the predetermined channel, which lowers the power supply voltage $V_{DD1}$.

Subsequently, when the input voltage $V_{IN}$ returns to a value within the second voltage range $V_{RNG2}$ at the time point t4, the internal component protection signal S3 is negated. In the overvoltage protection operation shown in FIG. 5B, the operation of the power supply circuit 102_1 is restored after the internal component protection signal S3 is negated. In contrast, in the undervoltage protection operation, the suspension of the operation of the power supply circuit 102_1 is maintained even after the internal component protection signal S3 is negated. Subsequently, when the input voltage $V_{IN}$ exceeds the threshold value $V_{L1}$ at the time point t2, the abnormality detection signal S1 is negated, and the microcomputer 206 is notified of this negation. The microcomputer 206 generates the control signal S2. The interface circuit 106 restores the operation of the power supply circuit 102_1 according to the control signal S2.

It should be noted that, in some cases, the power supply voltage $V_{DD2}$ supplied to the microcomputer 206 cannot be maintained at the minimum operation voltage. This operation is represented by the line of alternately long and short dashes. If the microcomputer 206 cannot operate, the control signal S2 cannot be transmitted immediately after the time point t2. In this case, the microcomputer 206 transmits the control signal S2 indicated by the line of alternately long and short dashes at the time point t5 after the microcomputer 206 is restarted. In response to the control signal S2, the system power supply circuit 100 restarts the power supply circuit 102_1.

This operation allows the operation of the power supply circuit of the predetermined channel to be suspended even if a failure has occurred in the communication with the microcomputer in the undervoltage state. This arrangement allows the circuit to be protected.

Next, description will be made regarding the reason why there is a difference in the triggers for restoring the operation of the suspended channel between the overvoltage state and the undervoltage state.

As indicated by the line of alternately long and short dashes in FIG. 6B, in the undervoltage state in which the input voltage $V_{IN}$ falls, this arrangement has the potential to cause a situation in which the microcomputer 206 is shut down due to an insufficient power supply voltage $V_{DD2}$ supplied to the microcomputer 206. In this situation, in a case in which the system power supply circuit 100 restarts the power supply circuit 102_1 of the predetermined channel independently at the time point t4, this leads to an inconsistency between the state of the microcomputer 206 and the state of the system power supply circuit 100. Specifically, a part of the power supply circuits, i.e., the power supply circuit 102_1 operates although the microcomputer 206 has not transmitted an operation instruction. In order to solve such a problem, after the voltage state is restored from the undervoltage state, this arrangement instructs the microcomputer 206 to control the restart operation, thereby preventing such an inconsistency.

Next, returning to FIG. 3, further description will be made regarding the features of the system power supply circuit 100.

The system power supply circuit 100 includes the register 110 that stores a control value for each channel. The on/off state of the power supply circuit 102 of each channel is set according to the control value stored in the register 110. For example, the control value of a given channel is represented by one-bit data that can be set to 1 or 0. When the control value is "1", the power supply circuit 102 of the corresponding channel is set to the on state. When the control value is "0", the power supply circuit 102 of the corresponding channel is set to the off state.

The above-described control signal S2 includes multiple control values that correspond to the multiple respective channels CH1 through CHM. That is to say, the control signal S2 is represented by M-bit binary data. For example, the MSB (Most Significant Bit) represents the first channel CH1, and the LSB (Least Significant Bit) represents the M-th channel. Description will be made regarding an example in which M=6.

When S2=[111111], the control signal S2 represents a state in which all the channels CH1 through CH6 are turned on.

When S2=[000000], the control signal S2 represents a state in which all the channels CH1 through CH6 are turned off.

When S2=[011000], the control signal S2 represents a state in which only the second channel CH2 and the third channel CH3 are turned on and the remaining channels are turned off As a result of the input voltage $V_{IN}$ becoming lower than the lower-side threshold value $V_{L2}$ of the second voltage range $V_{RNG2}$ as shown in FIG. 6B, the power supply circuit of the predetermined channel is suspended. In this stage, the system power supply circuit 100 initializes the multiple control values stored in the register 110, and waits for the writing of the control signal S2 updated by the microcomputer 206. This allows the overall system including the system power supply circuit 100 and the microcomputer 206 to be restored to a desired state according to an instruction of the microcomputer 206 even if the microcomputer 206 has shut down.

Furthermore, the register 110 stores a setting value that defines the lower-side threshold value $V_{L2}$ of the second voltage range $V_{RNG2}$. This arrangement allows the microcomputer 206 to write the setting value to the register 110. The allowable fall in voltage of the power supply voltages $V_{DD1}$ through $V_{DDM}$ that can occur due to the undervoltage state of the input voltage $V_{IN}$ is designed depending on the load circuits 204_1 through 204_M including the microcomputer 206.

With a given system, e.g., a first system, when $V_{IN}$<5 V, this causes a serious system error. With another system, e.g., a second system, when $V_{IN}$<3 V, this causes a serious system error. In this case, in a case in which the lower-side threshold value $V_{L2}$ of the second voltage range $V_{RNG2}$ is fixed to 5 V, and in a case of employing the second system, when $V_{IN}$=4 V, the second system is forcibly protected by means of the internal protection circuit 108 although the second system is able to operate normally under this condition. That is to say, in some cases, such an arrangement is undesirable. In order to solve such a problem, by allowing the designer of the overall system to set the lower-side threshold value $V_{L2}$ of the second voltage range $V_{RNG2}$, this arrangement supports the optimum protection for each system.

Usage

Figure 7:
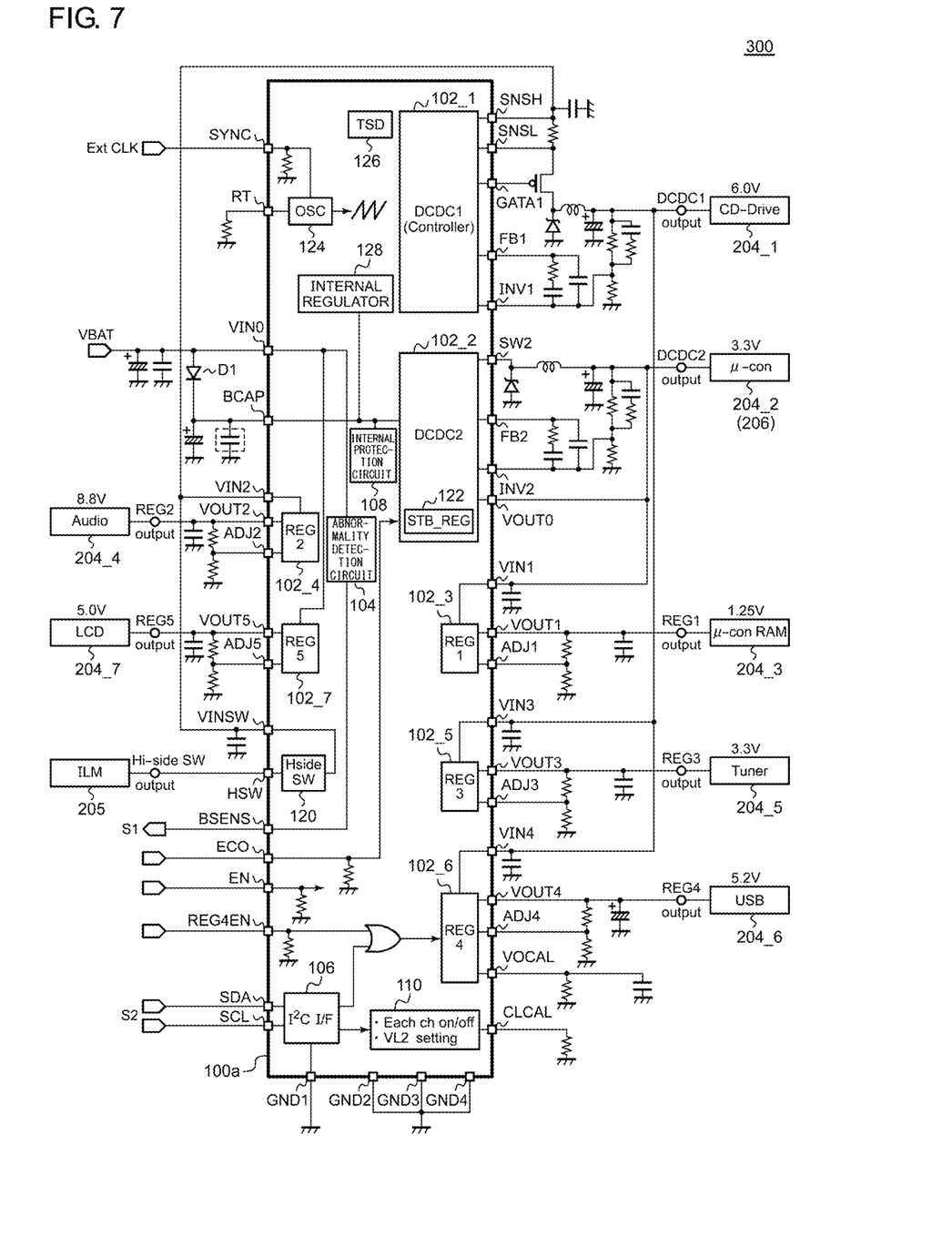
FIG. 7 is a block diagram showing an in-vehicle audio apparatus including a system power supply circuit.

The system power supply circuit 100 is suitably employed in an in-vehicle device that has the potential to involve large variation of the input voltage. Specifically, the system power supply circuit 100 is suitably employed for in-vehicle electronic devices such as in-vehicle audio apparatuses, etc. FIG. 7 is a block diagram showing an in-vehicle audio apparatus 300 including a system power supply circuit 100a. The system power supply circuit 100a has a 7-channel configuration including the power supply circuits 102_1 through 102_7. The first channel and the second channel are each configured as a step-down DC/DC converter. The third through seventh channels are each configured as a linear regulator. Some of the linear regulators are configured to step down the output voltage of the DC/DC converter of another channel.

The load circuits 204_1 through 204_7 are configured as a CD drive, the microcomputer (206), RAM (Random Access Memory) for the microcomputer, an audio circuit, a tuner block, a USB interface circuit, and a liquid crystal display, respectively.

A VIN0 terminal of the system power supply circuit 100a corresponds to the above-described VIN terminal. The battery voltage $V_{BAT}$ that corresponds to the input voltage $V_{IN}$ is input to the VIN0 terminal. Furthermore, the battery voltage $V_{BAT}$ is input to a BCAP terminal via a diode D1. The internal protection circuit 108 may judge, based on the voltage at the BCAP terminal, whether the input voltage $V_{IN}(V_{BAT})$ is included in or otherwise deviates from the second voltage range $V_{RNG2}$. The abnormality detection signal S1 described above is output via the BSENS pin. The interface circuit 106 is configured as an I²C interface, which receives the control signal S2 from the microcomputer 206 via the SDA pin and the SCL pin.

In the on state, a high-side switch 120 supplies the input voltage $V_{IN}$ to an illumination device 205.

The second channel CH2 is provided with a standby regulator 122 in parallel with the DC/DC converter. When the overall system is set to the standby state, the DC/DC converter is suspended, and the power supply voltage is supplied to the microcomputer 206 from the standby regulator 122. For example, the operation of the standby regulator 122 is controlled according to a signal input to the ECO pin.

When the DC/DC converter of the second channel CH2 cannot operate in the overvoltage state or the undervoltage state, this arrangement allows the standby regulator 122 to operate as a backup power supply.

An oscillator 124 generates a cyclic signal required for each DC/DC converter. Upon detecting an overheat state in the system power supply circuit 100a, a thermal shutdown circuit 126 executes an appropriate shutdown operation. An internal regulator generates a stabilized voltage to be used within the system power supply circuit 100a.

An enable signal is input to an EN pin for controlling the overall on/off operations of the system power supply circuit 100a. When the REG4EN pin is set to the high level, or when the interface circuit 106 receives a signal which is an instruction to turn on, the power supply circuit 102_6 of the sixth channel operates.

Description has been made above regarding an embodiment of the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

With the embodiment, as shown in FIG. 4, the protection region to be supported by the internal protection circuit 108 of the system power supply circuit 100 is provided to both the overvoltage side and the undervoltage side. Also, such a protection region may be provided to only one from among both sides. For example, in a case in which the lower limit of the second voltage range $V_{RNG2}$ is not employed, the protection operation of the internal protection circuit 108 is effectively supported only in the overvoltage state. Conversely, in a case in which the upper limit of the second voltage range $V_{RNG2}$ is not employed, the protection operation of the internal protection circuit 108 is effectively supported only in the undervoltage state.

Second Modification

The restoration operation after the undervoltage state shown in FIG. 6B may be provided independently by the internal protection circuit 108 alone using the negation of the internal component protection signal S3 as a trigger without a need to receive the control signal S2 from the microcomputer 206 in the same manner as the restoration operation provided after the overvoltage state shown in FIG. 5A.

Third Modification

The in-vehicle audio apparatus 300 shown in FIG. 7 has been described for exemplary purposes only as an example of an electronic device or an in-vehicle electronic device. The present invention is suitably applicable to power supplies for car navigation systems, in-vehicle TVs, in-vehicle computers, etc. Also, the usage of the present invention is not restricted to in-vehicle devices. Also, the present invention is applicable to various kinds of usages and platforms that has the potential to involve large variation of the input voltage.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A system power supply circuit structured to receive an input voltage at an input node, and to supply a power supply voltage to a plurality of load circuits including a microcomputer, the system power supply circuit comprising:
    a plurality of channels of power supply circuits that respectively correspond to the plurality of load circuits;
    an abnormality detection circuit structured to generate an abnormality detection signal in response to a variation of the input voltage, which is negated when the input voltage is within a first voltage range, and asserted when the input voltage at the input node deviates from the first voltage range, and to output the abnormality detection signal to the microcomputer;
    an interface circuit structured to communicate with the microcomputer, to receive a control signal generated by the microcomputer in response to an assertion of the abnormality detection signal, and to suspend the power supply circuit of a particular channel indicated by the control signal; and
    an internal protection circuit structured to suspend at least one power supply circuit of at least one predetermined channel when the input voltage at the input node deviates from a second voltage range defined to be wider than the first voltage range, wherein the abnormality detection circuit and the internal protection circuit are structured to monitor the same input voltage at the same input node directly.

2. The system power supply circuit according to claim 1, wherein, when the input voltage comes to be within the second voltage range after the power supply circuit of the predetermined channel is suspended as a result of the input voltage exceeding an upper-side threshold of the second voltage range, the internal protection circuit restarts an operation of the power supply circuit of the predetermined channel.

3. The system power supply circuit according to claim 1, wherein the power supply circuit of the predetermined channel suspended as a result of the input voltage becoming lower than a lower-side threshold value of the second voltage range is restored in response to a control signal received from the microcomputer.

4. The system power supply circuit according to claim 1, further comprising a register,
    wherein on/off states of the plurality of channels of the power supply circuits are switched according to a control value stored at a corresponding address in the register,
    wherein the control signal comprises a plurality of control values that respectively correspond to the plurality of channels, and each of which specifies the on/off state of the power supply circuit of the corresponding channel, and wherein the interface circuit writes each of the plurality of control values to a corresponding address in the register.

5. The system power supply circuit according to claim 4, wherein, when the power supply circuit of the predetermined channel is suspended as a result of the input voltage becoming lower than a lower-side threshold value of the second voltage range, the plurality of control values stored in the register are initialized.

6. The system power supply circuit according to claim 4, wherein the register is structured to have an address at which a setting value that defines the lower-side threshold value of the second voltage range is to be stored.

7. The system power supply circuit according to claim 1, wherein the input voltage is a battery voltage output from an in-vehicle battery,
and wherein the system power supply circuit is used for electronic devices installed in a vehicle.

8. The system power supply circuit according to claim 1, integrated on a single semiconductor substrate, or otherwise configured as a module.

9. An electronic device comprising:
a DC power supply;
a plurality of load circuits including a microcomputer; and
the system power supply circuit according to claim 1, structured to receive an input voltage from the DC power supply, and to supply a power supply voltage to the plurality of load circuits.

10. The electronic device according to claim 9, wherein the DC power supply is configured as an in-vehicle battery, and wherein the electronic device is structured as an in-vehicle electronic device.

11. A protection method for an electronic device, comprising:
a system power supply circuit stepping up or otherwise stepping down an input voltage at an input node and supplying a power supply voltage to a plurality of load circuits including a microcomputer;
the system power supply circuit generating an abnormality detection signal in response to a variation of the input voltage, which is negated when the input voltage at the input node is within a first voltage range, and which is asserted when the input voltage deviates from the first voltage range;
the microcomputer generating a control signal that indicates a channel to be suspended in response to an assertion of the abnormality detection signal, and transmitting the control signal to the system power supply circuit;
the system power supply circuit suspending a power supply circuit of a particular channel specified by the control signal in response to the received control signal; and
the system power supply circuit suspending at least one power supply circuit of a predetermined channel when the input voltage at the input node deviates from a second voltage range defined to be wider than the first voltage range directly.

\* \* \* \* \*